Patented Dec. 11, 1951

2,578,359

UNITED STATES PATENT OFFICE 2,578,359

STABILIZATION OF HALOGENATED ORGANIC COMPOUNDS WITH DIBUTYL DIPHENYL TIN

Russell L. Jenkins, Anniston, Ala., assignor to Monsanto Chemical Company, St. Louis, Mo., a corporation of Delaware No Drawing. Application August 19, 1946, Serial No. 691,652

15 Claims. (Cl. 252—63.5)

This invention relates to novel compositions of matter and particularly to dielectric and/or heat transfer media comprising halogenated organic compounds and dibutyl diphenyl tin.

Heretofore, numerous halogenated organic compounds or compositions containing same have been employed in the production of dielectric and heat exchanging media. Thus, such materials have been used as insulating and cooling media for transformers, cables, switches and other electrical apparatus, and as coating and impregnating substances for paper and other porous materials in the production of capacitors. In addition, the above compounds and compositions have found use as heat transfer media for controlling the temperature of catalytic and other chemical reactors, for cooling gases and liquids, and for numerous other operations.

Halogenated organic compounds have been used in the above applications because of their high dielectric constants, thermal stability, resistance to oxidation, non-flammability and other desirable properties. However, notwithstanding these advantages, it is known that when these compounds are exposed to elevated temperatures and/or high voltages they decompose liberating hydrogen halides which are exceedingly corrosive to electrical apparatus and heat exchanging equipment. This decomposition is also manifested in a number of other ways. For example, under high operating temperatures and direct current voltages, capacitors impregnated with halogenated organic compounds undergo a characteristic type of deterioration which results in an ever increasing leakage current, a short capacitor life, visible localized decomposition of the dielectric and corrosion of the electrodes. Moreover, in the case of capacitors operating on alternating current, the decomposition may result in an excessive increase in power factor of the dielectric material.

To overcome these disadvantages, numerous corrosion inhibitors or stabilizers for halogenated organic compounds have been proposed and one of the most important of these is tetraphenyl tin. However, this compound has properties which materially restrict its use on a technical scale. For example, it possesses a very low order of solubility in halogenated organic compounds and as a corollary thereto has a marked tendency to crystallize from solution. Consequently, during transportation and storage, it separates out and leaves an insufficient amount of material in solution to be effective as a stabilizer. This crystallizing tendency is very pronounced in cold weather but is by no means restricted thereto as crystallization frequently takes place as a result of jarring the shipping container during transportation. Therefore, tetraphenyl tin is at best only a fairly satisfactory stabilizer for halogenated organic compounds in warm weather and even then there is no assurance that it will remain in solution in effective concentrations.

I have made the surprising discovery that compositions, in which the above objectionable properties are substantially reduced or completely eliminated, may be produced by combining dibutyl diphenyl tin with halogenated organic compounds. More particularly, I have discovered that dibutyl diphenyl tin is superior to tetraphenyl tin in its effectiveness as a stabilizer for halogenated organic compounds, and, what is equally important, it has none of the disadvantages which flow from the use of tetraphenyl tin. It is thought that dibutyl diphenyl tin effects stabilization by preventing substantial decomposition of the halogenated organic compound in the first instance, by forming a complex with the hydrogen halide liberated as a result of decomposition or by a combination of these factors.

For a more complete understanding of the present invention, reference is made to the experiments hereinafter described.

The apparatus used in these experiments included a testing cell consisting of a 5.1 cm. by 30 cm. glass tube having a spherical female joint sealed in the open end. This tube was fitted with male joints containing a hydrogen chloride inlet tube provided with a differential manometer for measuring the HCl pressure, and a hydrogen chloride outlet tube equipped with a mercury manostat for controlling the HCl pressure. A Sargent temperature controlling device using a zero-current relay was employed to maintain the testing cell contents at 75° C.

Using the above apparatus, a series of color standards were first prepared in the following manner.

EXPERIMENT I

A standard composition was prepared by dissolving 0.118% by weight of tetraphenyl tin in a mixture composed of 60% by weight of Aroclor 1260 (chlorinated biphenyl containing 60% by weight of chlorine) and 40% by weight of trichlorobenzene and then 200 milliliters of this composition and 5 pieces of manila paper (1.5 cm. in width and 2.0 cm. in length) were introduced into the testing cell of the above described apparatus. After a thirty minute waiting period, anhydrous hydrogen chloride was fed into the atmosphere above the solution and out through the mercury manostat which was set at 150 mm. static pressure. Then, the HCl rate was adjusted so that 154 mm. pressure was obtained on the manometer, after which the minimum HCl rate maintaining a static pressure of 150 mm. of Hg, was employed.

The apparatus was operated for 3 hours at a temperature of 75° C. and under a static pressure of 150 mm. of mercury. At the end of the first hour and each succeeding half hour within this period, the test papers were successively removed from the standard solution. The results of this experiment are illustrated in the following table:

Table I

| Standard Composition | Rating No. | HCl Exposure Time | Color of Manila Paper |
|---|---|---|---|
| | | Hours | |
| Aroclor 1260—Trichlorobenzene Mixture, 99.882% by wt.; Tetraphenyl Tin, 0.118% by wt | 1 | 1 | White. |
| | 2 | 1.5 | Very pale yellow. |
| | 3 | 2.0 | Do. |
| | 4 | 2.5 | Light brown. |
| | 5 | 3.0 | Medium brown. |

The foregoing table shows that tetraphenyl tin readily reacted with and removed HCl from solution and that, as soon as it was consumed, the anhydrous HCl dehydrated the test papers, the degree and rate of dehydration increasing with increased exposure to HCl. Thus, for 2 hours while the stabilizer was still effective, the anhydrous HCl produced very little change in the color of the test papers, indicating that no appreciable amount of dehydration had taken place. However, when the tetraphenyl tin had been consumed after about 2.5 hours exposure, the rate and degree of dehydration increased sharply as evidenced by the change in color of the test papers from a pale yellow to light brown. Finally, after 3 hours exposure to HCl, the color of the test papers changed from light to medium brown, thereby showing further substantial progress of the dehydration process. In addition to the color variation, this dehydration process was manifested by an ever increasing brittleness of the test papers with increase in the time of exposure.

In Experiment I, it will be noted that the test paper exposed to the HCl pressure of 150 mm. of mercury on the solution for 3 hours was given a rating of 5. This rating number will be used as a standard in Experiments II and III to demonstrate the stabilizing action of tetraphenyl tin and dibutyl diphenyl tin, and also the relative effectiveness of these two compounds as agents for removing HCl from solution.

EXPERIMENT II 200 milliliters of a mixture composed of 60% by weight of Aroclor 1260 and 40% by weight of trichlorobenzene, and a piece of manila test paper were placed in the testing cell and the apparatus operated for 2.5 hours under the same conditions as Experiment I. The results of this experiment are indicated below:

Table II

| Composition | Rating No. | HCl Exposure Time |
|---|---|---|
| | | Hours |
| Aroclor 1260, 60%; Trichlorobenzene, 40% | 3-4 | 1.5 |
| | 5 | 1.75 |
| | 6 | 2.0 |
| | 7 | 2.5 |

Tables I and II demonstrate that tetraphenyl tin has a definite and substantial stabilizing action on halogenated organic compounds since an HCl exposure time of only 1.75 hours was required to dehydrate the test paper until it had a rating number of 5, whereas with 0.118% by weight of tetraphenyl tin, it was necessary to expose the test paper to HCl for 3 hours to obtain this result.

EXPERIMENT III

Experiment II was repeated, using samples of the same composition which respectively contained 0.05%, 0.1% and 0.2% by weight of dibutyl diphenyl tin. The results obtained are given in Table III.

Table III

| Solution | Stabilizer | Concentration | Time | Rating No. |
|---|---|---|---|---|
| | | Per cent | Hours | |
| "Standard Composition." | Tetraphenyl Tin | 0.118 | 3 | 5 |
| Sample 1 | Dibutyl Diphenyl Tin | 0.05 | 3 | 2-3 |
| Sample 2 | do | 0.10 | 3 | 2-3 |
| Sample 3 | do | 0.20 | 3 | 2-3 |

Table III shows that dibutyl diphenyl tin removes hydrogen chloride from solution more efficiently than tetraphenyl tin since with Sample 2 which contained 0.10% by weight of dibutyl diphenyl tin the test paper had a rating of 2-3, whereas under the same conditions and with substantially the same amount of tetraphenyl tin (0.118%) the test paper had a rating of 5. Furthermore, the table shows that dibutyl diphenyl tin had a longer life and removed HCl at a faster rate than tetraphenyl tin as with Sample I, the test paper had a rating of 2-3, whereas with the "standard composition" containing more than twice as much tetraphenyl tin, the test paper had a rating of only 5.

EXPERIMENT IV

Experiment II was repeated for a period of five hours, employing 0.5% by weight of dibutyl diphenyl tin. At the end of this experiment, the test paper had a rating of 2 which demonstrated that improved protection is obtained by increasing the concentration of the stabilizer.

In order to compare the solubilities of tetraphenyl and dibutyl diphenyl tin and also to determine the stability of the resulting products to crystallization, solubility tests were run on freshly prepared solutions of these compounds in a mixture consisting of 60% by weight of Aroclor 1260 and 40% by weight of trichlorobenzene. The results obtained are given in the following table.

Table IV

| Sample No. | Temperature | Conc. of Stabilizer | Stabilizer | Results |
|---|---|---|---|---|
| | °C. | Per cent | | |
| 1 | 20 | 0.301 | Tetraphenyl Tin | (¹) |
| 2 | 20 | 0.207 | do | No Turbidity. |
| 3 | 20 | 0.116 | do | Do. |
| 4 | 0-1 | 0.207 | do | (¹) |
| 5 | 0-1 | 0.116 | do | (²) |
| 6 | 0-1 | 50 | Dibutyl Diphenyl Tin | (³) |

¹ Turbidity followed by clearing and crystal formation.
² Solution clear at beginning of test but crystallization occurred after 39 days.
³ No turbidity 2 mos. 6 days (sample discarded).

The solubility tests show that dibutyl diphenyl tin is readily soluble in the above mixture, whereas tetraphenyl tin has a solubility therein of less than 0.3% at 20° C., and less than 0.2% at 0–1° C. In fact, it was found by other tests that dibutyl diphenyl tin is miscible in all proportions in the above chlorinated biphenyl-trichlorobenzene mixture.

In view of the above experimental data, it is evident that dibutyl diphenyl tin is not only a more effective agent for removing HCl from solution than tetraphenyl tin, but it has the added advantage of unlimited solubility and greater freedom from crystallization than tetraphenyl tin. Hence, the use of dibutyl diphenyl tin provides the assurance that the stabilizer will be present in solution in effective concentrations since it does not tend to separate out by crystallization. This, however, is not true of tetraphenyl tin as it will be noted that, although this compound produced a clear solution at a temperature of 0–1° C., crystallization finally occurred after 39 days, notwithstanding the fact that it was dissolved in the above Aroclor-trichlorobenzene mixture to the extent of only 0.116% by weight (see Sample 5). This is a serious disadvantage since it leads to such a reduction in the concentration of dissolved tetraphenyl tin as to materially impair its effectiveness as a stabilizer.

To demonstrate the fact that dibutyl diphenyl tin does not adversely affect the electrical properties of the halogenated organic compound stabilized, resistivity measurements were made on solutions of dibutyl diphenyl tin and tetraphenyl tin in a mixture composed of 60% by weight of Aroclor 1260 and 40% by weight of trichlorobenzene. The following results were obtained:

*Table V*

| Stabilizer | Concentration of Stabilizer | Resistivity Measurement |
|---|---|---|
| Tetraphenyl Tin | 0.1% | 90×10⁹ ohm cms. |
| Dibutyl Diphenyl Tin | 0.1% | 86×10⁹ ohm cms. |

Table V shows that the property of resistivity is essentially the same in both cases, and also that dibutyl diphenyl tin has no deleterious effect on the electrical properties of the mixture since the latter compares favorably with the composition containing tetraphenyl tin, which is known to meet the required specifications in this respect.

The affinity of dibutyl diphenyl tin for HCl and other hydrogen halides, its high degree of solubility in or compatibility with chlorinated biphenyl (or halogenated organic compounds), its stability to crystallization in such compositions, its ability to remove hydrogen halides from solutions without forming a precipitate or harmful gases and its ability to counteract the dehydration of paper in the presence of chlorinated biphenyl (or other halogenated organic compounds) without appreciably affecting the electrical properties of the chlorinated biphenyl, all combine to provide a stabilizer or corrosion inhibitor which is eminently suitable for use in the production of dielectric and/or heat transfer media including halogenated aryl compounds. The above compositions containing dibutyl diphenyl tin are, therefore, excellent insulating and cooling media for transformers, cables, switches and other electrical apparatus. They are also useful as impregnating compositions for condensers, and as heat transfer media.

In accordance with the present invention stabilized condensers may be prepared in the following manner.

The condenser is produced by interleaving two dielectric sheets, such as linen or Kraft paper, with two sheets of aluminum or tin foil, and rolling the interleaved sheets in the conventional manner. The rolled condenser is then impregnated by any suitable process, such as vacuum impregnation with chlorinated biphenyl having dissolved therein a small proportion of dibutyl diphenyl tin. As illustrative of suitable impregnating materials, the following range of compositions are mentioned.

COMPOSITION I

Parts by weight
a. Liquid chlorinated biphenyl, particularly chlorinated biphenyl containing from 42% to 60% by weight of chlorine _____ 90–100
b. Dibutyl diphenyl tin _____ 0.05 to 10

COMPOSITION II

Parts by weight
a. Chlorinated biphenyl containing from 42% to 60% by weight of chlorine _____ 60
b. Trichlorobenzene _____ 40
c. Dibutyl diphenyl tin _____ 0.05 to 10

Of the above range of compositions, the following is preferred.

COMPOSITION III

Parts by weight
a. Chlorinated biphenyl containing 60% chlorine _____ 60
b. Trichlorobenzene _____ 40
c. Dibutyl diphenyl tin _____ 0.5

Compositions I, II and III are also highly efficient impregnants for cables and other electrical elements. They are likewise useful as heat transfer media and as cooling and insulating media for transformers, switches, cables and other electrical apparatus.

The description of the present invention has been directed to compositions containing chlorinated biphenyl, trichlorobenzene and dibutyl diphenyl tin, but it is to be understood that the invention is not restricted thereto but may be applied to halogenated organic compounds generally. Thus, dibutyl diphenyl tin may also be used to stabilize chlorinated naphthalene, chlorinated diphenyl ketone, chlorinated diphenyl oxide, chlorinated diphenyl methane, chlorinated alkylated benzenes, chlorinated alkylated biphenyls, ethyl trichlorobenzene, ethyl tetrachlorobenzene, ethyl pentachlorobenzene, chlorinated terphenyls, chlorinated quaterphenyls, chlorinated paraffinic hydrocarbons, chlorinated alicyclic hydrocarbons, chlorinated oxygen-containing organic compounds, chlorinated rubber, chlorobutadiene polymers, polyvinyl chloride, polymeric vinyl chloroacetate, chlorinated fats, chlorinated vegetable oils, chlorinated animal oils, chlorinated mineral oils and mixtures of two or more of these. In place of the chlorinated compounds, the corresponding fluorine, bromine and iodine derivatives may be used. In fact, any halogenated organic compound which tends by reason of its halogen content to cause corrosion of metals, may be stabilized or rendered substantially non-corrosive by means of dibutyl diphenyl tin.

The method of incorporating dibutyl diphenyl tin varies with the halogenated organic compound or composition to be stabilized. If the compound or composition is a liquid at room temperature, the stabilizer is merely dissolved therein in suitable concentrations. If it is a solid, the stabilizer is mixed therewith by the use of solvents or swelling agents or by means of mixing rolls, etc.

In the case of halogenated polymers, the stabilizer may also be added before or during polymerization of the monomer.

The quantity of dibutyl diphenyl tin used varies with the halogenated organic compound or composition to be stabilized. In general, satisfactory results are obtained by employing the stabilizer in an amount varying from 0.05% to 10% by weight of the halogenated organic compound or the halogenated organic compound mixture, but it is understood that the invention is not limited thereto. In the case of chlorinated biphenyl, dibutyl diphenyl tin has been found to give surprisingly effective results when employed in an amount corresponding to 0.5% by weight of the chlorinated compound.

The dibutyl diphenyl tin employed in the various experiments, tests, compositions, etc., described above was not the pure compound but a mixture having an average analysis of dibutyl diphenyl tin, which mixture contained a major proportion of dibutyl diphenyl tin together with minor proportions of monobutyl triphenyl tin and monophenyl tributyl tin. It is to be understood, however, that it is within the scope of the present invention to use either the pure compound or mixtures of the above type containing same so that the expression "dibutyl diphenyl tin" occurring in the claims is intended to cover either one or both of the above modifications of the invention.

As many widely different embodiments of this invention may be made without departing from the spirit and scope thereof, it is to be understood that the invention is not limited to the specific embodiments thereof except as defined in the appended claims.

What I claim is:

1. A composition of matter consisting essentially of a halogenated aryl hydrocarbon and a stabilizing amount of dibutyl diphenyl tin.

2. A composition of matter consisting essentially of a chlorinated aryl hydrocarbon and up to 10% by weight of dibutyl diphenyl tin.

3. A composition of matter consisting essentially of chlorinated biphenyl and up to 10% by weight of dibutyl diphenyl tin.

4. A composition of matter consisting essentially of chlorinated biphenyl and from 0.05% to 10% by weight of dibutyl diphenyl tin, said chlorinated biphenyl containing from 42% to 60% by weight of chlorine.

5. A heat transfer and dielectric composition consisting essentially of a halogenated aryl hydrocarbon and up to 10% by weight of dibutyl diphenyl tin.

6. A dielectric composition consisting essentially of a chlorinated aryl hydrocarbon and from 0.05% to 0.5% by weight of dibutyl diphenyl tin.

7. An insulating and cooling composition for electrical apparatus consisting essentially of chlorinated biphenyl and from 0.05% to 10% by weight of dibutyl diphenyl tin.

8. An insulating and cooling composition for electrical apparatus consisting essentially of a liquid chlorinated biphenyl and about 0.5% by weight of dibutyl diphenyl tin.

9. An insulating and cooling composition for electrical apparatus consisting essentially of chlorinated biphenyl and from 0.05% to 0.5% by weight of dibutyl diphenyl tin, said chlorinated biphenyl containing from 42% to 60% by weight of chlorine.

10. A heat transfer and dielectric composition consisting essentially of chlorinated biphenyl, trichlorobenzene and from 0.05% to 10% by weight of dibutyl diphenyl tin.

11. A dielectric composition comprising, in combination, about 90% to about 100% by weight of chlorinated biphenyl and from about 0.05% to about 10% by weight of dibutyl diphenyl tin, said chlorinated biphenyl containing from 42% to 60% by weight of chlorine.

12. A dielectric composition comprising, in combination, about 60% by weight of chlorinated biphenyl, about 40% by weight of trichlorobenzene and about 0.05% to about 10% by weight of dibutyl diphenyl tin, said chlorinated biphenyl containing from 42% to 60% by weight of chlorine.

13. A dielectric composition consisting of about 60% by weight of chlorinated biphenyl, about 40% by weight of trichlorobenzene and about 0.5% by weight of dibutyl diphenyl tin, said chlorinated biphenyl containing about 60% by weight of chlorine.

14. A heat transfer and dielectric composition consisting essentially of a chlorinated aryl hydrocarbon and about 0.05% to about 10% by weight of dibutyl diphenyl tin.

15. A heat transfer and dielectric composition consisting essentially of a chlorinated aromatic compound and about 0.05% to about 10% by weight of dibutyl diphenyl tin.

RUSSELL L. JENKINS.

REFERENCES CITED

The following references are of record in the file of this patent:

UNITED STATES PATENTS

| Number | Name | Date |
|---|---|---|
| 1,857,761 | McCabe et al. | May 10, 1932 |
| 2,036,274 | Holler | Apr. 7, 1936 |
| 2,041,594 | Clark | May 19, 1936 |
| 2,181,914 | Rosen | Dec. 5, 1939 |
| 2,181,915 | Rosen | Dec. 5, 1939 |
| 2,211,558 | Colin et al. | Aug. 13, 1940 |
| 2,259,978 | McLean | Oct. 21, 1941 |
| 2,339,091 | McLean | Jan. 11, 1944 |
| 2,468,544 | Clark | Apr. 26, 1949 |